US009948654B2

(12) United States Patent
Surace et al.

(10) Patent No.: US 9,948,654 B2
(45) Date of Patent: *Apr. 17, 2018

(54) METHOD FOR ACCESSING A PLURALITY OF SERVICES BY A MOBILE TERMINAL USER, AND RELATED SECURE DEVICE

(71) Applicant: Pacific Dolphin Holdings LLC, Atlanta, GA (US)

(72) Inventors: Domenico Surace, Paris (FR); Nicolas Goubly, Boulogne Billancourt (FR); Thomas Vulin, Paris (FR); Samy Rdissi, Champigny Sur Marne (FR); Gilles Reant, Boulogne Billancourt (FR)

(73) Assignee: Pacific Dolphin Holdings LLC, Atlanta, GA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/046,292

(22) Filed: Feb. 17, 2016

(65) Prior Publication Data
US 2016/0164879 A1 Jun. 9, 2016

Related U.S. Application Data

(63) Continuation of application No. 14/516,800, filed on Oct. 17, 2014, now Pat. No. 9,298,904, which is a
(Continued)

(51) Int. Cl.
*H04L 29/06* (2006.01)
*G06F 21/34* (2013.01)
(Continued)

(52) U.S. Cl.
CPC ............ *H04L 63/102* (2013.01); *G06F 21/34* (2013.01); *G06F 21/35* (2013.01); *G06F 21/606* (2013.01);
(Continued)

(58) Field of Classification Search
CPC .......... G06F 21/34; G06F 21/35; G06F 21/44; G06F 21/606; G06F 21/6218;
(Continued)

(56) References Cited

U.S. PATENT DOCUMENTS 7,992,197 B2  8/2011  Naaman et al.
8,380,177 B2  2/2013  Laracey
(Continued)

FOREIGN PATENT DOCUMENTS

| CN | 102217267 A | 10/2011 |
| EP | 2353269 A1 | 8/2011 |
| WO | WO 2004/092993 A1 | 10/2004 |

OTHER PUBLICATIONS

Schneier, Applied Cryptography, 1996, John Wiley & Son, Inc., 2nd Edition, Section 2.5.*
(Continued)

*Primary Examiner* — Minh Dinh
(74) *Attorney, Agent, or Firm* — Alston & Bird LLP (57) ABSTRACT

The invention relates to a method for enabling the user of at least one mobile terminal to access a plurality of services, said method consisting of: creating (E1) a user account containing user identification data; installing (E2) a software application for accessing the plurality of services on said mobile terminal; creating (E5) an image containing at least one software application identifier on the mobile terminal using the software application; decoding (E6) the data contained in the image using a secure entity for managing the software application; and authorizing (E8) or not authorizing (E9) the access of the user to the plurality of services based on the decoded data.

16 Claims, 3 Drawing Sheets

Related U.S. Application Data continuation of application No. 13/128,320, filed as application No. PCT/FR2008/001581 on Nov. 7, 2008, now Pat. No. 8,893,238.

(51) Int. Cl.
*G06F 21/35* (2013.01)
*G06F 21/60* (2013.01)
*H04L 9/30* (2006.01)
*G06F 21/62* (2013.01)
*H04W 12/06* (2009.01)

(52) U.S. Cl.
CPC ............ *G06F 21/6218* (2013.01); *H04L 9/30* (2013.01); *H04L 63/0442* (2013.01); *G06F 2221/031* (2013.01); *H04W 12/06* (2013.01)

(58) Field of Classification Search
CPC ........... G06F 2221/031; H04L 63/0442; H04L 63/08; H04L 63/102; H04L 63/12; H04L 63/126; H04L 9/30; H04W 12/06
See application file for complete search history.

(56) References Cited

U.S. PATENT DOCUMENTS

| | | | |
|---|---|---|---|
| 8,632,000 | B2 | 1/2014 | Laracey |
| 8,893,238 | B2 | 11/2014 | Surace et al. |
| 9,298,904 | B2 | 3/2016 | Surace et al. |
| 2001/0054111 | A1 | 12/2001 | Lee et al. |
| 2004/0043758 | A1 | 3/2004 | Sorvari et al. |
| 2004/0225613 | A1 | 11/2004 | Narayanaswami et al. |
| 2005/0097330 | A1 | 5/2005 | Lundblade |
| 2005/0282520 | A1* | 12/2005 | Coureau ................. G06F 21/10 455/410 |
| 2008/0175390 | A1 | 7/2008 | Alessio et al. |
| 2009/0113527 | A1 | 4/2009 | Naaman et al. |
| 2010/0100946 | A1* | 4/2010 | Hallam-Baker ........ H04L 63/06 726/5 |
| 2011/0213980 | A1 | 9/2011 | Surace et al. |
| 2014/0331294 | A1 | 11/2014 | Ramallo et al. |
| 2014/0357315 | A1 | 12/2014 | John |
| 2015/0025986 | A1 | 1/2015 | Patel et al. |
| 2015/0040199 | A1 | 2/2015 | Surace et al. |

OTHER PUBLICATIONS

Stallings, Cryptography and Network Security: Principles and Practice, 1999, Prentice Hall, $2^{nd}$ Edition, pp. 441-461.*
International Bureau of WIPO, International Preliminary Report on Patentability enclosing the International Searching Authority's Written Opinion (and English translation of same) for International Application No. PCT/FR2008/001581, dated May 10, 2011, 11 pages, Switzerland.
International Searching Authority, International Search Report for International Application No. PCT/FR2008/001581, dated Aug. 3, 2009, 4 pages, European Patent Office, The Netherlands.
United States Patent and Trademark Office, Notice of Allowance for U.S. Appl. No. 13/028,320, dated Jul. 18, 2013, USA.
United States Patent and Trademark Office, Notice of Allowance for U.S. Appl. No. 14/516,800, dated Nov. 20, 2015, USA.
United States Patent and Trademark Office, Office Action for U.S. Appl. No. 13/128,320, dated Oct. 26, 2012, USA.
United States Patent and Trademark Office, Office Action for U.S. Appl. No. 14/516,800, dated May 8, 2015, USA.

* cited by examiner

METHOD FOR ACCESSING A PLURALITY OF SERVICES BY A MOBILE TERMINAL USER, AND RELATED SECURE DEVICE

This application is a continuation of U.S. application Ser. No. 14/516,800 filed Oct. 17, 2014, which is a continuation of U.S. application Ser. No. 13/128,320 filed May 9, 2011 and now issued as U.S. Pat. No. 8,893,238, which was a national stage filing under 35 U.S.C. § 371 of PCT/FR2008/001581 filed Nov. 7, 2008, which International Application was published by the International Bureau in French on May 14, 2010, each of which are hereby incorporated herein in their entirety by reference.

The present invention relates to a method enabling a user of a mobile terminal to access a plurality of services.

The present invention also relates to a secure device associated with this method.

During the last decade, telephones and other mobile terminals have assumed an increasingly important place in everyday life.

Given this cultural and economic reality, numerous players have emerged to form the mobile value chain. In particular, mobile marketing has expanded, and embedded or downloadable dedicated mobile platforms and applications have been created.

From a simple means for making voice calls, the mobile telephone has been transformed into a multimedia terminal, which can also be seen as a tool for identifying the user in a mobility situation (street, stores, airports, etc.).

Among the mobile applications that use the identity of the mobile terminal user, there are, notably, the offering of discount coupons on a mobile telephone (5 Euros discount on a product, −10%, etc.), the possibility of purchasing tickets from a mobile telephone (transport, concerts, cinema, etc.), the extension of loyalty programs to mobiles (thus rendering loyalty cards on a physical medium obsolete), or even micropayment by mobile telephone or mobile payment ("m-payment").

The document US-A-2001 0054111 describes, for example, a system in which a user accesses various services via a wireless terminal. A user account contains user identification data. When the user wants to access a service from his wireless terminal, he logs onto a server via a communication network. The server asks the user his identification data and then checks if it corresponds to the identification data of that user's account. If it does, the server generates a bar code corresponding to a service selected by the user, transmits the bar code to the user's terminal and displays it on the screen via the current connection. The user can then use the bar code to obtain the service.

For example, the bar code may represent a discount coupon when purchasing a product in a store. Thus, the user logs onto the server in order to receive, on his mobile terminal, the bar code containing the discount coupon. The user goes to the store equipped with his mobile terminal containing the bar code. A bar code reader reads the bar code displayed on the mobile terminal. Then, the bar code is decoded in order to extract the discount coupon. The user then obtains the discount corresponding to his discount coupon.

In such a system, each time the user wants to obtain a service, he must set up a connection between his mobile terminal and the server in order to obtain the corresponding bar code. This involves communication network connection costs, which are chargeable to the user, and chargeable each time he wants to download a bar code to his mobile terminal.

Furthermore, this type of system may have a security level that is inadequate for limiting fraud.

The aim of the present invention is to remedy the drawbacks of the prior art, by proposing a method enabling a user of a mobile terminal to access a plurality of services and a secure device associated with this method, enabling the user to access these services securely and without repeated communication network connection costs.

To this end, the present invention proposes a method enabling a user of at least one mobile terminal to access a plurality of services.

According to the invention, the method comprises steps consisting in:

creating a user account containing identification data of the user;

installing in the mobile terminal a software application for accessing the plurality of services;

creating, in the mobile terminal, by using the software application, an image containing at least one software application identifier;

decoding, by using a secure management entity of the software application, data contained in the image; and enabling or not enabling the user to access the plurality of services according to the decoded data.

As explained later, these steps are not necessarily performed in the order in which they are itemized above.

According to the present invention, the step for creation of the image is entirely performed by the processing means and any other resources of the mobile terminal (that is to say, means of the terminal whose function is energy supply, computation, storage, human-machine interface, etc.), when these processing means and other possible resources use the software application.

In other words, the mobile terminal behaves independently to create the image. In particular, when it creates the image, the mobile terminal acts independently of any outside intervention and notably, it acts without intervention from the secure management entity and without requiring any connection to the network.

In short, the user can access a plurality of services by means of an image generated in a mobile terminal by a software application. Consequently, there is no need to set up a connection to a communication network for the user to obtain the image.

Furthermore, the method enabling the user to access the plurality of services from his mobile terminal is secure, not only because of the absence of connection to the networks when creating the image, but also because of the use of a secure management entity of the software application, of the secure web platform type for example. This security makes it possible to limit fraud.

Moreover, the software application can be easily installed in a mobile terminal. For example, it can be installed simply by downloading, or pre-embedded in the factory, or else received by communication via a wireless technology.

According to one embodiment, the method may also comprise a step consisting in activating, in the mobile terminal, the software application, by associating the software application identifier with the user account.

The association of the software application identifier with the user account makes it possible to limit fraud with respect to the software application and enhance the management of the user accounts.

The method may also include, prior to the step for creation of the image, a step consisting in entering into the mobile terminal a user personal identification code. This code, for example of the "PIN" (Personal Identification Number) type, conditions access to the plurality of services.

In other words, the authorization for the user to access the services is decided according to the user's personal identification code. This makes the method all the more secure.

In practice, if, for example, a second unauthorized user, not knowing the personal identification code, tries to use the mobile terminal to create an image by using the software application, he will ultimately not obtain authorization to access the plurality of services.

The step for creation of the image may include an encryption step consisting in encrypting at least the software application identifier. Thus, because of the encryption of certain data, the access method is all the more secure.

Advantageously, the encryption step consists in also encrypting the user personal identification code.

Thus, the image generated is unique for a given user and for a software application.

Furthermore, during the encryption step, it is possible, for example, to use a public key encryption algorithm. In such an embodiment, the decoding step includes a decryption step consisting in decrypting the data contained in the image by using a private key associated with the public key.

Thus, the data contained in the image created by the software application are decoded only when both keys are available, which makes the method all the more safe.

The user identification data contained in the user account comprises at least one software application identifier.

According to one embodiment, the user identification data comprises a single software application identifier, associated with at least one mobile terminal.

One and the same software application identifier can therefore be shared between a number of mobile terminals of one and the same user.

In another embodiment, the user has a number of mobile terminals and the user identification data comprise a plurality of software application identifiers which are respectively associated with these mobile terminals.

Thus, a user account contains as many software application identifiers as the user has mobile terminals in which the software application is installed.

It should be noted that, as a variant, it would be possible to consider having a number of software applications—and just as many software application identifiers—on one and the same mobile terminal.

According to one characteristic, the image created in the mobile terminal has a predetermined validity period.

By limiting this period, the security of the method is enhanced.

For example, it is thus possible to prevent access to the plurality of services by a hacker attempting to use a previously created image contained in a mobile terminal, as soon as the validity period of this image has expired.

The software application identifier and/or the user personal identification code may comprise a series of alphanumeric characters.

This type of data is easy to implement and is also particularly suitable in case of subsequent encryption of the corresponding data.

The image may comprise, for example, one, two or three dimensions (for example one or two spatial dimensions and a third dimension that may be color) and may be a bar code or any type of image other than a bar code.

In the case where the image is a bar code, it may be a bar code with one or two spatial dimensions, in black and white or at least partially in color.

This representation, currently widely used, thus does not in any way entail the fitting of a specific kit, either in the mobile terminal, or in the secure management entity of the software application, or on the side of the suppliers of services from the abovementioned plurality of services. Furthermore, such a representation is particularly well suited to the display on the screen of a mobile terminal, and to the volume of data to be encrypted.

With the same aim as indicated above, the present invention also proposes a secure management device of a software application enabling a user of at least one mobile terminal to access a plurality of services.

According to the invention, the device comprises:
  a module for decoding data contained in an image containing at least one application identifier, this image having been created previously in the mobile terminal by using the software application; and
  a module for authorizing or not authorizing the user to access the plurality of services according to the decoded data.

The device may also comprise a module for at least partially activating the software application in the mobile terminal.

The device may also include a cryptography module, for example (but not necessarily) of the public key and private key cryptography type.

It may also include a module for storing a plurality of user accounts, containing users identification data.

The device may also comprise a module suitable for limiting the validity period of the image.

The device may comprise a module for generating the software application identifier. This software application identifier may comprise a series of alpha-numeric characters.

The device may also comprise a module for at least partially controlling the installation of the software application in the mobile terminal.

Still with the same aim, the present invention also proposes a computer program product that can be loaded into a programmable appliance, comprising instruction sequences for implementing a method as briefly described above, when this computer program product is loaded into and executed by the programmable appliance.

Still with the same aim, the present invention also proposes a mobile terminal comprising processing means suitable for implementing at least one of the steps of a method as briefly described above.

This mobile terminal may be, for example, a mobile telephone, a personal digital assistant (PDA) a podcasting appliance, etc.

The advantages of the secure management device for a software application, and the particular characteristics and advantages of the computer program product and of the mobile terminal being similar to those of the method, briefly described above, enabling a user of a mobile terminal to access a plurality of services, they are not repeated here.

Other particular features and advantages of the invention will become apparent from the following description of particular embodiments.

In the appended drawings, given as nonlimiting examples.

Figure 1:
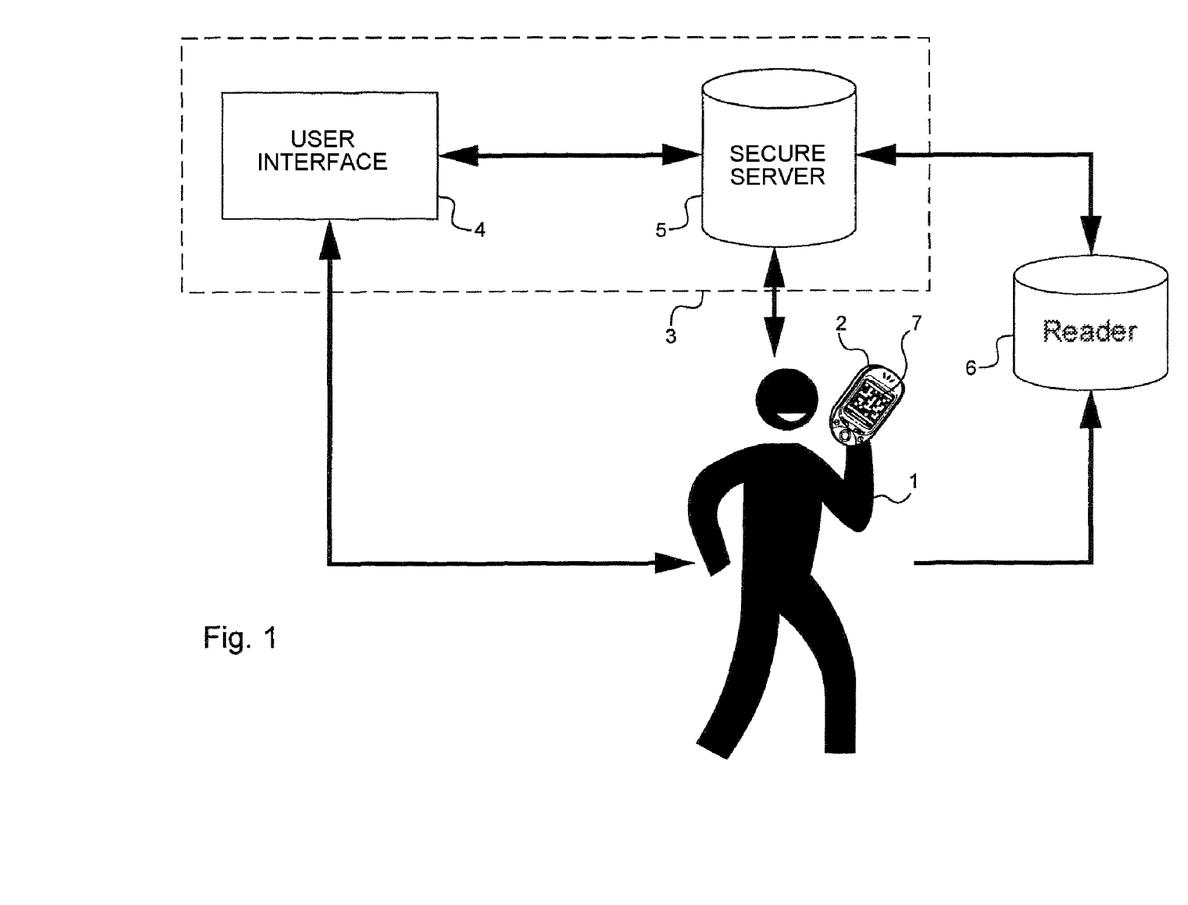
FIG. 1 schematically illustrates the context of the present invention, in a particular embodiment.
Figure 2:
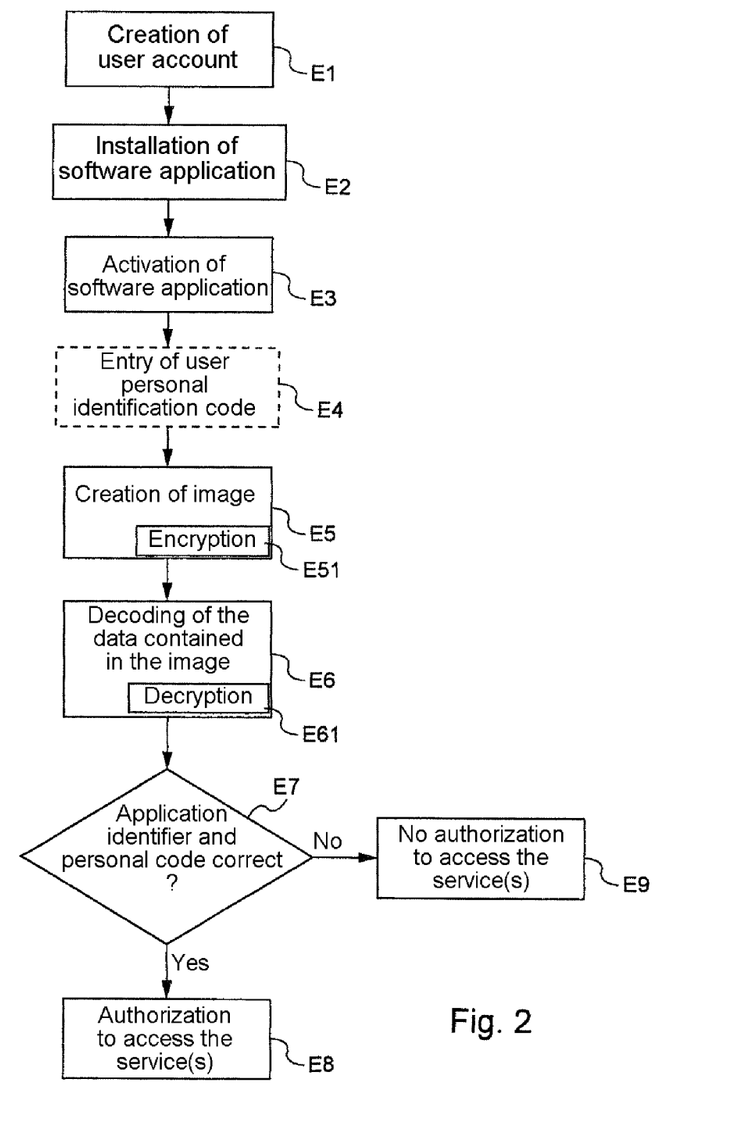
FIG. 2 is a flow diagram representing a particular embodiment of an access method according to the invention.

The context of the invention, and the method according to the invention, is described first, with reference to FIG. 1 and to FIG. 2, in a particular embodiment.

As FIG. 1 shows, a user 1 has at least one mobile terminal 2. The user accesses a plurality of services through this mobile terminal.

The mobile terminal may be any mobile terminal that has a screen. As nonlimiting examples, the mobile terminal may be a mobile telephone, a laptop computer, a personal digital assistant, a walkman or even a video game console.

The services that the user 1 can access via his mobile terminal may be varied. For example, these services may be at least those mentioned in the introduction, namely, the offering of discount coupons on a mobile telephone, the possibility of purchasing and using tickets from a mobile telephone, the extension of loyalty programs to mobiles, or even micropayment by mobile telephone or mobile payment.

For the user 1 to be able to access the services, step E1 for creation of a user account is implemented. This user account contains user identification data, for example his surname and first name, the nature of his loyalty cards, of his subscriptions (these examples being in no way limiting), etc.

In a particular embodiment, the user account is created before any use of the software application by the user 1.

For example, the user account may be created in a secure management entity 3.

The secure management entity 3 is, for example, a secure web platform. Thus, the user 1 accesses the web platform via an Internet connection and creates a user account via a user interface 4.

It will be noted that the service providers can also access the secure management entity 3 via an interface. This interface may be different from the user interface 4. In practice, the service providers access the secure management entity 3 for purposes other than those of the users. Thus, for example, the providers may log onto the secure management entity 3 in order to request the creation of discount coupons for certain users, the updating of user loyalty programs, or even the creation of tickets previously purchased by the users.

The secure management entity 3 also includes one or more secure server(s) 5, suitable for managing the user accounts created by the users 1.

Also, as FIG. 2 shows, during an installation step E2, a software application is installed in the mobile terminal 2.

This "installation" may be either a preinstallation, that is to say a pre-embedding in the factory for example, or an installation phase conducted after the mobile terminal has been placed on the market.

In the particular embodiment described here, the installation is implemented by the user 1 of the mobile terminal 2.

According to one example, the secure management entity 3 supplies the software application to the user 1 of the mobile terminal 2.

Thus, the user wanting to install the software application in his mobile terminal 3 can, for example, log onto the secure management entity 3 and download the software application.

In another example, the user 1, logged onto the secure management entity 3, can initiate on his mobile terminal 2 the execution of a software application installation program which will be run in the secure management entity 3.

In yet another example, the secure management entity 3 may send the mobile terminal 2, at the request of the user or not, the software application or an object enabling the software application to be installed. This sending of the request can be done, for example, in the form of a text, multimedia or other type message, addressed by the secure management entity 3 to the mobile terminal 2.

Generally, the installation process, which is performed by downloading or by any other appropriate technique, is not necessarily the responsibility of the secure management entity 3. Also, in embodiments in which the secure management entity 3 participates in the installation process, other entities (such as, for example, the mobile terminal in the example described above) may possibly also participate in the installation.

Whatever the installation mode, data interchanges for the installation can be performed via a wireless technology of the short range radio link type, such as, for example, via the "Bluetooth" (registered trademark) wireless technology.

As a variant, the installation may be a preinstallation implemented during the assembly and/or the manufacture of the mobile terminal, that is to say that the software application is already installed when the mobile terminal is placed on the market. Obviously, in this case, the step E1 for creation of the user account follows the step E2 for installation (preinstallation) of the software application (the order of the steps E1 and E2 illustrated in FIG. 2 is reversed).

As FIG. 2 shows, once the software application has been installed in the mobile terminal 2 and the user 1 wants to use it, the next step consists in activating it.

To this end, a step E3 for activation of the software application installed in the mobile terminal 2 is implemented. This step E3 consists in associating an identifier of the software application with the user account.

This identifier may be created either before, or during the implementation of this activation step E3. Thus, prior to this activation step E3, or during said step, a step for generation of the software application identifier is performed.

The software application identifier may comprise, for example, a series of alphanumeric characters (that is to say, a predetermined number of letters and/or numerals and/or other symbols or characters).

In the particular embodiment described here, the software application identifier is generated by the secure management entity 3. This guarantees security against fraud since the software application and its identifier originate from the secure management entity 3. Thus, when the secure management entity 3 supplies the software application to the manufacturers and/or assemblers of mobile terminals and/or to the users, it can, for example (but not necessarily), at the same time supply the identifier of the software application.

In another particular embodiment, the software application identifier is generated by the software application. For example, the step for generation of the software application identifier may be performed in the mobile terminal.

The software application identifier may be supplied to the user 1 in various ways, for example, it may be displayed on the screen of the mobile terminal 2 by the software application, it may be sent to the user by email or by postal mail.

The user 1 is informed of the software application identifier, for example, during the first use of the application on the mobile terminal 2. Thus, according to a particular exemplary embodiment, the software application identifier is displayed on the screen of the mobile terminal 2 and the user 1 can then log onto the secure management entity 3 and enter the software application identifier into his user account, for example, by entry on a keyboard or any other means. This entry can be performed, for example, by means of the mobile terminal 2 itself or via a personal computer, fixed or not, that is able to set up a connection with the secure management entity 3.

Once the software application has been activated, it can be used by the user 1 in order to access the services.

Thus, when the user 1 wants to access a service, he launches the use of the software application in the mobile terminal 2. This leads to the implementation of a step E5 for creation of an image 7 (see FIG. 1) in the mobile terminal 2.

In the embodiment described here, prior to the implementation of the step E5 for creation of the image, a step E4 consisting, for the user 1, in entering a user personal identification code, is implemented.

For example, the user personal identification code comprises a series of alphanumeric characters. As a nonlimiting example, this personal code contains four numerals.

The user 1 is prompted for this personal code by the software application when the software application is launched in the mobile terminal 2. This makes the method according to the invention all the more safe.

The image created during the step E5 for creation of the image contains at least the software application identifier.

In the particular embodiment described here, the image 7 created also contains the personal identification code entered by the user 1. This code is contained in the image 7 in encrypted or unencrypted form, depending on the degree of security sought.

It will be noted that, in the particular embodiment described here, the image 7 is generated and displayed on the screen, whether the user's personal identification code is correct or incorrect. Similarly, the decoding of the image 7 will also take place (step E6 described below). However, the authorization to access the services will not be delivered (steps E7, E8 and E9 described below).

The creation of the image 7 in all cases adds even more security against fraud, by notably limiting fraud by reverse engineering on the image 7, in the mobile terminal 2.

Once the image 7 has been created, the user 1 can use it to access the services for which he is authorized. In order to know the services that he is authorized to access, the data contained in the image 7 that is created will be decoded.

In particular, the image 7 is captured or read by an appropriate reader 6 corresponding to a point of sale (store or virtual merchant site). Then, the data contained in the image 7 can be decoded during a decoding step E6, by using the secure management entity 3.

In this embodiment, the image 7 is a two-dimensional bar code.

Obviously, this exemplary embodiment is in no way limiting; the image 7 may be a bar code with a single dimension or of any other type.

Obviously, the capture or reading of the image 7 can be performed by other reading means, for example by a photographic appliance or a camera.

The decoded data are checked during a checking step E7. When the decoded data (in particular, the software application identifier and the user's personal identification code) are correct, an authorization to access (E8) the service(s) is delivered to the user 1.

On the contrary, when the decoded data (in particular the identifier of the application and/or the user's personal identification code) are not correct, the authorization to access the service(s) is not delivered (E9).

The image 7 contains at least the identifier of the software application, preferably in encrypted form to increase the level of security of the method.

In the particular embodiment described here, the image 7 also contains the user personal identification code in encrypted form.

Thus, as illustrated in FIG. 2, the step E5 for creation of the image 7 includes an encryption step E51, consisting in encrypting the identifier of the software application and the personal identification code.

Obviously, in a variant in which the step E4 consisting in entering the user personal identification code does not exist, only the identifier of the software application is encrypted during the encryption step E51. However, as a variant, it would be possible not to encrypt the software application identifier.

In the particular exemplary embodiment described in conjunction with FIG. 2, the encryption step E51 is implemented by using a public key encryption algorithm and the decoding step E6 includes a decryption step E61 consisting in decrypting the data contained in the image 7, by using a private key associated in a known manner with the public key.

Various encryption and decryption algorithms can be employed (symmetrical cryptography, hashing, digital signature, exchange of keys, etc.). These are known to those skilled in the art and will not be described in more detail here.

In the particular embodiment described here, the image 7 created in the mobile terminal 2 has a predetermined validity period. As explained above, this increases the security of the method according to the invention. This validity period may, for example, be of the order of a few minutes (typically 30 minutes, but this example being in no way limiting). A longer or shorter period may be provided, notably according to the desired level of security.

In an exemplary embodiment, a time stamp is incorporated in the image 7 created in the mobile terminal 2, that is to say, information concerning the instant at which the image 7 was created is inserted into the image 7.

The timestamp can be checked by the secure management entity 3, for example once the decoding step E6 has been performed.

The user 1 may have a number of mobile terminals 2 in which the software application is installed.

In the embodiment described, the user account contains a different application identifier for each mobile terminal 2 belonging to the user 1.

As a variant, the software applications respectively associated with the various mobile terminals 2 of a same user 1 have one and the same software application identifier.

In another embodiment, the software application activation step E3 can be dispensed with. In this variant, the order of some of the steps of FIG. 2 is different: the first step implemented is the step E2 for installing the application, followed, if necessary, by the step E4 for entry of the user personal identification code. Then, the step E5 for creation of the image and the decoding step E6 are implemented, followed by the step E1 consisting in creating the user account.

The validity period of a user account created in this way may be limited to a predetermined value, for better security of use and better management of the user accounts. It is possible, if necessary, to provide for the number of services to which a user of such an account with limited duration has access to be limited.

The creation of such an account with limited validity period, called "non-active account", may be followed by the step E3 for activation of the software application. In this case, the user account is said to have been activated.

Figure 3:
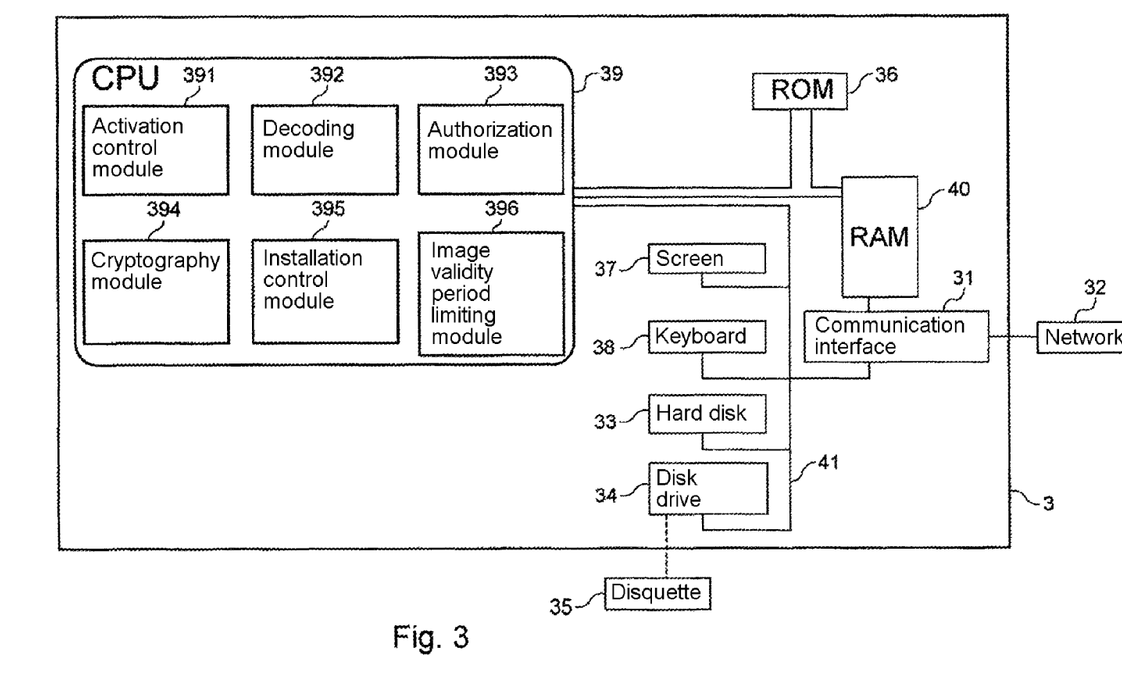
FIG. 3 illustrates a particular embodiment of a secure management device for a software application, according to the invention.

FIG. 3 illustrates a particular embodiment of a secure management device 3 for a software application enabling a user 1 of a mobile terminal 2 to access a plurality of services according to the method described above.

This device 3 is, for example, a secure Web platform.

The device 3 includes a communication interface 31 linked to a network 32 capable of receiving digital data to be processed by the device 3 in the context of the implementation of the invention.

The device 3 also includes a storage means 33 such as, for example, a hard disk. It also includes a drive 34 for disks 35. This disk 35 may be a disquette, a CD-ROM, or a DVD-ROM, a memory card or a USB device, for example.

The disk 35, like the disk 33, may contain data processed according to the invention, such as, for example, a plurality of user accounts, and, in a first variant, the program or programs implementing the invention which, once read by the device 3, will be stored on the hard disk 33.

According to a second variant, the program or programs enabling the device to implement the invention may be stored in read-only memory 36 (called ROM in the drawing).

As a third variant, the program or programs may be received to be stored in a manner identical to that described previously via the communication network 32.

This same device has a screen 37 that can be used to display the processed data or to serve as an interface with the user 1 who can thus select other data to be processed, using the keyboard 38 or any other means (mouse, thumbwheel or stylus for example).

The central processing unit 39 (called CPU in the drawing) executes the instructions relating to the implementation of the invention, instructions that are stored in the read-only memory 36 or in the other storage elements. For example, the central processing unit 39 participates in the performance of some of the steps illustrated in FIG. 2, as described above. On power-up, the processing programs stored in a non-volatile memory, for example the ROM 36, are transferred into the random-access memory RAM 40 which then contains the executable code of the invention and the registers for storing the variables needed to implement the invention.

In particular, in the embodiment of FIG. 3, the central processing unit 39 includes a module 391 for controlling the activation of the software application in the mobile terminal, a module 392 for decoding the data contained in the image 7 which was previously created in the mobile terminal 2 using the software application, and a module 393 for authorizing or preventing access to the services by the user 1 according to the decoded data.

In the embodiment described here, the central processing unit 39 also includes a public key and private key cryptography module 394, a module 395 for controlling the installation of the software application in the mobile terminal 2, a module for generating the software application identifier (not illustrated) and a module 396 for limiting the validity period of the image 7 which was created in the mobile terminal 2.

More generally, an information storage means, readable by a computer or by a microprocessor, incorporated or not incorporated in the device, possibly totally or partially removable, stores a program implementing the method according to the invention.

As FIG. 3 shows, the communication bus 41 enables the communication between the various elements included in the device 3 or linked to it. The representation of the bus 41 is not limiting and, notably, the central processing unit 39 is likely to communicate instructions to any element of the device 3 directly or via another element of the device 3.

Thus, when, for example, a user 1 wants to use a discount code to make a purchase in a point of sale, once the software application has been installed and activated, he launches the software application and enters his personal identification code. An image 7 is created on his mobile terminal 2, this image containing at least the identifier of the software application and the user's personal identification code, in encrypted or unencrypted form.

At the point of sale, the image 7 is read and transmitted to the secure management entity 3. The secure management entity 3 decodes the data contained in the image 7, checks the services to which the user 1 is entitled and communicates at least this information to the point of sale.

It should be noted that, in the particular embodiment described here, when the user accesses the secure management entity 3 in order to create or activate a user account, he may access, either a single server, or a plurality of servers between which the various functionalities are divided (in particular, storage and/or management of the user accounts, decoding of the images, delivery and/or management of the authorizations to access the services).

In the case of a plurality of servers with division of the roles, at least some of these servers may be adapted to exchange between them and/or with the other servers of the plurality of servers, certain information necessary to the execution of at least some of these functionalities.

Thus, by virtue of the invention, the user can access various services securely and without repeated costs of connection to the communication networks.

Obviously, numerous modifications may be made to the exemplary embodiments described previously without departing from the context of the invention.

The invention claimed is:

1. A computer-implemented method for enabling a user (1) of at least one mobile terminal (2) to access at least one of a plurality of services, the method comprising steps for:
    creating (E1) a user account containing identification data of said user (1);
    installing (E2) in said mobile terminal (2) a software application for accessing said plurality of services, wherein the software application is associated with at least one software application identifier;
    entering (E4) into the mobile terminal (2) a user personal identification code;
    creating (E5), in the mobile terminal (2), by using said software application, an authorization identifier comprising the at least one software application identifier and the user personal identification code;
    providing the software application identifier to a secure management entity (3); and
    enabling (E8) or not enabling (E9) the user (1) to access said plurality of services according to the software application identifier.

2. The method of claim 1, further comprising steps for activating (E3), in the mobile terminal (2), said software application, by associating said software application identifier with said user account.

3. The method of claim 1, further comprising steps for encrypting at least the software application identifier before providing the software application identifier to the secure management entity.

4. The method of claim 3, wherein encrypting the software application identifier further comprises steps for encrypting a user personal identification code.

5. The method of claim 3, wherein encrypting the software application identifier comprises steps for encrypting the software application identifier according to a public key encryption algorithm and wherein the method further comprises steps for decrypting, according to a private key associated with said public key, said software application identifier.

6. The method of claim 1, wherein the user identification data contained in the user account comprises at least one software application identifier.

7. The method of claim 3, wherein the user identification data comprises a single software application identifier, associated with said at least one mobile terminal (2).

8. The method of claim 6, wherein the user has a number of mobile terminals and the user identification data comprises a plurality of software application identifiers which are respectively associated with said mobile terminals.

9. The method of claim 1, wherein the software application identifier comprises a series of alphanumeric characters.

10. The method of claim 1, wherein the user personal identification code comprises a series of alphanumeric characters.

11. The method of claim 1, wherein said installation step (E2) is performed at least partially from the secure management entity (3).

12. The method of claim 1, wherein said authorization identifier is a one- or two-dimensional bar code.

13. A computer program product comprising a non-transitory computer-readable storage medium having instruction sequences stored thereon, wherein said instruction sequences instructs a processor to perform steps for enabling a user (1) of at least one mobile terminal (2) to access a plurality of services, said steps comprising:
creating (E1) a user account containing identification data of said user (1);
installing (E2) in said mobile terminal (2) a software application for accessing said plurality of services, wherein the software application is associated with at least one software application identifier;
creating (E5), in the mobile terminal (2), by using said software application, an authorization identifier comprising the at least one software application identifier and a user personal identification code;
providing the software application identifier to a secure management entity (3); and
enabling (E8) or not enabling (E9) the user (1) to access said plurality of services according to the software application identifier.

14. The computer program product of claim 13, wherein said authorization identifier is a one- or two-dimensional bar code.

15. A mobile terminal (2) for enabling a user (1) of the mobile terminal to access a plurality of services, said mobile terminal comprising:
a memory; and
one or more processors configured to perform steps comprising:
creating (E1) a user account containing identification data of said user (1);
installing (E2) in said mobile terminal (2) a software application for accessing said plurality of services, wherein the software application is associated with at least one software application identifier;
creating (E5), in the mobile terminal (2), by using said software application, an authorization identifier comprising the at least one software application identifier and a user personal identification code;
providing, when the user requests access to at least one of said plurality of services, the software application identifier to a secure management entity (3) of said software application to determine if the user is authorized to access said plurality of services,
wherein the user is enabled or not enabled to access said plurality of services according to the software application identifier.

16. The mobile terminal of claim 15, wherein said authorization identifier is a one- or two-dimensional bar code.

\* \* \* \* \*